United States Patent
Roca Rosero et al.

(10) Patent No.: US 11,428,534 B2
(45) Date of Patent: Aug. 30, 2022

(54) METHOD, APPARATUS, AND COMPUTER PROGRAM PRODUCT FOR MAP MATCHING LOCATION DATA TO A MAP

(71) Applicant: HERE Global B.V., Eindhoven (NL)

(72) Inventors: Luis Alfonso Roca Rosero, Veldhoven (NL); Norman Danilo Castro Téllez, Bogotá (CO)

(73) Assignee: HERE GLOBAL, B.V., Eindhoven (NL)

( * ) Notice: Subject to any disclaimer, the term of this patent is extended or adjusted under 35 U.S.C. 154(b) by 332 days.

(21) Appl. No.: 16/535,715

(22) Filed: Aug. 8, 2019

(65) Prior Publication Data
US 2021/0041249 A1    Feb. 11, 2021

(51) Int. Cl.
*B60W 10/00* (2006.01)
*G01C 21/32* (2006.01)
(Continued)

(52) U.S. Cl.
CPC ............ *G01C 21/32* (2013.01); *G06F 16/29* (2019.01); *G06T 7/70* (2017.01); *G06T 2207/30244* (2013.01)

(58) Field of Classification Search
CPC . G01C 21/32; G06T 7/70; G06T 2207/30244; G06F 16/29
(Continued)

(56) References Cited

U.S. PATENT DOCUMENTS 5,991,688 A  *  11/1999  Fukushima  ............  G01C 21/34
                                                  701/410
8,543,320 B2     9/2013  Zheng et al.
(Continued)

FOREIGN PATENT DOCUMENTS

CN      104236556 A     12/2014
CN      106227726 A     12/2016

OTHER PUBLICATIONS

Tomio Miwa, Takaaki Sakai, Taka Morikawa, "Route Identification and Travel Time Prediction Using Probe-Car Data," Oct. 2004, Graduate Scholl of Environmental Studies, Nagoya University, entire document (Year: 2004).*

(Continued)

*Primary Examiner* — Tyler J Lee
*Assistant Examiner* — Tiffany P Ohman
(74) *Attorney, Agent, or Firm* — Alston & Bird LLP

(57) ABSTRACT

A method, apparatus, and computer program product are provided for map matching probe data to map elements. Methods may include: receiving a plurality of probe data points, where each probe data point includes location information associated with the probe apparatus and time information associated with the location information; establishing locations of the probe data points of a probe apparatus temporally sequenced along a path; establishing a radius around each of the probe data points; identifying map elements found within each radius; filtering probe data points to obtain a subset of probe data points; establishing correspondences between map elements found within each radius of the subset of probe data points; and map matching the subset of probe data points to one or more road segments based on the correspondences between map elements found within each radius of the subset of probe data points.

20 Claims, 14 Drawing Sheets

(51) Int. Cl.
*G06F 16/29* (2019.01)
*G06T 7/70* (2017.01)

(58) Field of Classification Search
USPC .......................................................... 701/446
See application file for complete search history.

(56) References Cited

U.S. PATENT DOCUMENTS

| | | | |
|---|---|---|---|
| 9,494,694 B1 | 11/2016 | Dong et al. | |
| 9,546,872 B1 | 1/2017 | Duan et al. | |
| 2015/0120174 A1* | 4/2015 | Lewis | G08G 1/0112 701/118 |
| 2016/0033292 A1* | 2/2016 | Duan | G01C 21/30 701/533 |
| 2016/0377440 A1* | 12/2016 | Dorum | G01C 21/30 702/150 |
| 2020/0011684 A1* | 1/2020 | McErlain, II | G01C 21/20 |

OTHER PUBLICATIONS

C.Y. Goh, J Dauwels, N. Mitrovic, M. T. Asif, A. Oran, P. Jaillet, "Online map-matching based on Hidden Markov model for real-time traffic sensing applications," Sep. 16-19, 2012, 15th International IEEE Conference on Intelligent Transporation Systems, entire document. (Year: 2012).*

Holmberg, K., *Map Matching by Optimization* [online] [retrieved Oct. 8, 2019]. Retrieved via the Internet: https://www.diva-portal.org/smash/get/diva2.785696/FULLTEXT01.pdf (dated Jan. 29, 2015) 73 pages.

Zhu, L. et al., *Trajectory Segmentation Map-Matching Approach for Large Scale, High-Resolution GPS Data* [online] [retrieved Oct. 8, 2019]. Retrieved via the Internet: https://www.osti.gov/biblio/1414899 (dated Jan. 1, 2017) 20 pages.

Decimal degrees—Wikipedia online] [retrieved Oct. 8, 2019]. Retrieved via the Internet: https://web.archive.org/web/20190718222807/https://en.wikipedia.org/wiki.Decimal_degrees (dated Jun. 20, 2019) 2 pages.

* cited by examiner

Point 1:
A - 93446727

Point 2:
A - 93446727
B - 102878683
C - 89370932

Point 3:
D - 102954107
E - 90947253
B - 102878683

Point 4:
D - 102954107
B - 102878683

Point 5:
D - 102954107

METHOD, APPARATUS, AND COMPUTER PROGRAM PRODUCT FOR MAP MATCHING LOCATION DATA TO A MAP

TECHNOLOGICAL FIELD

An example embodiment of the present invention relates to map matching location data to a map, and more particularly, to improving the efficiency with which location data is matched to a map by pre-matching data points from a path arranged based on timestamps in batches.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as vehicle speed profile information based on historical speed profiles of vehicles traveling among a road network.

Vehicle and traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy or slow traffic routes between an origin and a destination. However, in order to use crowd-sourced data from mobile devices or probe data, whether for map and traffic updates or to facilitate route navigation, the mobile device or probe data must be accurately map matched to map elements of the map to ensure the appropriate probe data is used with a corresponding map element, such as a road segment. Map matching is not a trivial task and requires substantial processing capacity given the vast amount of probe data available. As such, improvements to map matching processes are desirable.

BRIEF SUMMARY

A method, apparatus, and computer program product are provided in accordance with an example embodiment for map matching probe data based on a path of a probe apparatus. Methods may include: receiving a plurality of probe data points, each probe data point received from a probe apparatus comprising one or more sensors, where each probe data point includes location information associated with the probe apparatus and time information associated with the location information; establishing locations of the probe data points of a probe apparatus temporally sequenced along a path; establishing a radius around each of the probe data points; identifying map elements found within each radius; filtering probe data points to obtain a subset of probe data points; establishing correspondences between map elements found within each radius of the subset of probe data points; and map matching the subset of probe data points to one or more road segments based on the correspondences between map elements found within each radius of the subset of probe data points.

Establishing correspondences between map elements found within each radius of the subset of probe data points may include identifying map elements within a radius of a respective probe data point of the subset of probe data points that match elements within a radius of a subsequent probe data point of the subset of probe data points. Map matching the subset of probe data points to one or more road segments based on the correspondences between map elements found within each radius of the subset of probe data points may include map matching a first probe data point to a map element in response to the map element being the only map element common between the radius of the first probe data point and a next probe data point in the subset of probe data points. Filtering probe data points to obtain a subset of probe data points may include removing probe data points for which the map elements found within the radius of the respective probe data points are the same as the map elements found within the radius of a probe data point earlier in the temporally sequenced probe data points to obtain the subset of probe data points.

Methods may include, after filtering the probe data points: establishing one or more probe data points as breakpoints; and subdividing the subset of probe data points into a plurality of subset divisions of probe data points, where the subset is divided at breakpoint probe data points. Establishing one or more probe data points as breakpoints may include: identifying probe data points that meet at least one criterion for establishing a breakpoint, where the criteria includes at least one of: a probe data point having only a single map element within the radius of the probe data point; a probe data point having no map elements within the radius of the probe data point; or a probe data point having no map elements in common with a next sequential probe data point. Map matching the subset of probe data points to one or more road segments based on the correspondences between map elements found within each radius of the subset of probe data points may include map matching each subset division of probe data points in parallel to one or more road segments based on the correspondences between map elements found within each radius of the subset division of probe data points.

Embodiments of the present disclosure may include an apparatus including processing circuitry and at least one memory including computer program code. The at least one memory and computer program code configured to, with the processing circuitry, cause the apparatus to at least: receive a plurality of probe data points, each probe data point received from a probe apparatus having one or more sensors, where each probe data point includes location information associated with the respective probe apparatus and time information associated with the location information; establish locations of the probe data points temporally sequenced along a path; establish a radius around each of the probe data points; identify map elements found within each radius; filter probe data points to obtain a subset of probe data points; establish correspondences between map elements found within each radius of the subset of probe data points; and map match the subset of probe data points to one or more road segments based on the correspondences between map elements found within each radius of the subset of probe data points.

Causing the apparatus of some embodiments to establish correspondences between map elements found within each radius of the subset of probe data points may include causing the apparatus to: identify map elements within a radius of a respective probe data point of the subset of probe data points that match map elements within a radius of a subsequent probe data point of the subset of probe data points. Causing the apparatus of some embodiments to map match the subset of probe data points to one or more road segments based on the correspondences between map elements found within each radius of the subset of probe data points may include causing the apparatus to: map match a first probe data point to a map element in response to the map element being the only map element common between the radius of the first probe data point and a next probe data point in the subset of probe data points. Causing the apparatus of some embodiments to obtain a subset of probe data points may include causing the apparatus to: remove probe data points for which the map elements found within the radius of the respective probe data points are the same as the map elements found within the radius of a probe data point earlier in the temporally sequenced probe data points to obtain the subset of probe data points.

According to some embodiments, an apparatus may be caused to, after filtering the probe data points: establish one or more probe data points as breakpoints; and subdivide the subset of probe data points into a plurality of subset divisions of probe data points, where the subset is divided at breakpoint probe data points. Causing the apparatus of some embodiments to establish one or more probe data points as breakpoints may include causing the apparatus to: identify probe data points that meet at least one criterion for establishing a breakpoint, where the criteria includes at least one of: a probe data point having only a single map element within the radius of the probe data point; a probe data point having no map elements within the radius of the probe data point; or a probe data point having no map elements in common with a next sequential probe data point. Causing the apparatus to map match the subset of probe data points to one or more road segments based on the correspondences between map elements found within each radius of the subset of probe data points may include causing the apparatus to map match each subset division of probe data points in parallel to one or more road segments based on the correspondences between map elements found within each radius of the subset division of probe data points.

Embodiments of the present disclosure may provide a computer program product including at least one non-transitory computer-readable storage medium having computer-executable program code portions stored therein. The computer-executable program code portions including program code instructions configured to: receive a plurality of probe data points, each probe data point received from a probe apparatus including one or more sensors, where each probe data point includes location information associated with the respective probe apparatus and time information associated with the location information; establish locations of the probe data points temporally sequenced along a path; establish a radius around each of the probe data points; identify map elements found within each radius; filter probe data points to obtain a subset of probe data points; establish correspondences between map elements found within each radius of the subset of probe data points; and map match the subset of probe data points to one or more road segments based on the correspondences between map elements found within each radius of the subset of probe data points.

The program code instructions to establish correspondences between map elements found within each radius of the subset of probe data points may include program code instructions to: identify map elements within a radius of a respective probe data point of the subset of probe data points that match map elements within a radius of a subsequent probe data point of the subset of probe data points. The program code instructions to map match the subset of probe data points to one or more road segments based on the correspondences between map elements found within each radius of the subset of probe data points may include program code instructions to: map match a first probe data point to a map element in response to the map element being the only map element common between the radius of the first probe data point and a next probe data point in the subset of probe data points.

According to some embodiments, the program code instructions to filter probe data points to obtain a subset of probe data points may include program code instructions to: remove probe data points for which the map elements found within the radius of the respective probe data points are the same as the map elements found within the radius of a probe data point earlier in the temporally sequenced probe data points to obtain the subset of probe data points. Embodiments may include program code instructions to, after filtering probe data points: establish one or more probe data points as breakpoints; and subdivide the subset of probe data points into a plurality of subset divisions of probe data points, where the subset is divided at breakpoint probe data points. The program code instructions to establish one or more probe data points as breakpoints may include program code instructions to: identify probe data points that meet at least one criterion for establishing a breakpoint, where the criteria includes at least one of: a probe data point having only a single map element within the radius of the probe data point; a probe data point having no map elements within the radius of the probe data point; or a probe data point having no map elements in common with a next sequential probe data point.

Embodiments of the present disclosure may provide an apparatus. The apparatus of example embodiments may include: means for receiving a plurality of probe data points, each probe data point received from a probe apparatus comprising one or more sensors, where each probe data point includes location information associated with the probe apparatus and time information associated with the location information; means for establishing locations of the probe data points of a probe apparatus temporally sequenced along a path; means for establishing a radius around each of the probe data points; means for identifying map elements found within each radius; means for filtering probe data points to obtain a subset of probe data points; means for establishing correspondences between map elements found within each radius of the subset of probe data points; and means for map matching the subset of probe data points to one or more road segments based on the correspondences between map elements found within each radius of the subset of probe data points.

The means for establishing correspondences between map elements found within each radius of the subset of probe data points may include means for identifying map elements within a radius of a respective probe data point of the subset of probe data points that match elements within a radius of a subsequent probe data point of the subset of probe data points. The means for map matching the subset of probe data points to one or more road segments based on the correspondences between map elements found within each radius of the subset of probe data points may include means for map matching a first probe data point to a map element in response to the map element being the only map element common between the radius of the first probe data point and a next probe data point in the subset of probe data points. The means for filtering probe data points to obtain a subset of probe data points may include means for removing probe data points for which the map elements found within the radius of the respective probe data points are the same as the map elements found within the radius of a probe data point earlier in the temporally sequenced probe data points to obtain the subset of probe data points.

An apparatus may include, after filtering the probe data points: means for establishing one or more probe data points as breakpoints; and means for subdividing the subset of probe data points into a plurality of subset divisions of probe data points, where the subset is divided at breakpoint probe data points. The means for establishing one or more probe data points as breakpoints may include: means for identifying probe data points that meet at least one criterion for establishing a breakpoint, where the criteria includes at least one of: a probe data point having only a single map element within the radius of the probe data point; a probe data point having no map elements within the radius of the probe data point; or a probe data point having no map elements in common with a next sequential probe data point. The means for map matching the subset of probe data points to one or more road segments based on the correspondences between map elements found within each radius of the subset of probe data points may include means for map matching each subset division of probe data points in parallel to one or more road segments based on the correspondences between map elements found within each radius of the subset division of probe data points.

BRIEF DESCRIPTION OF THE DRAWINGS

Figure 1:
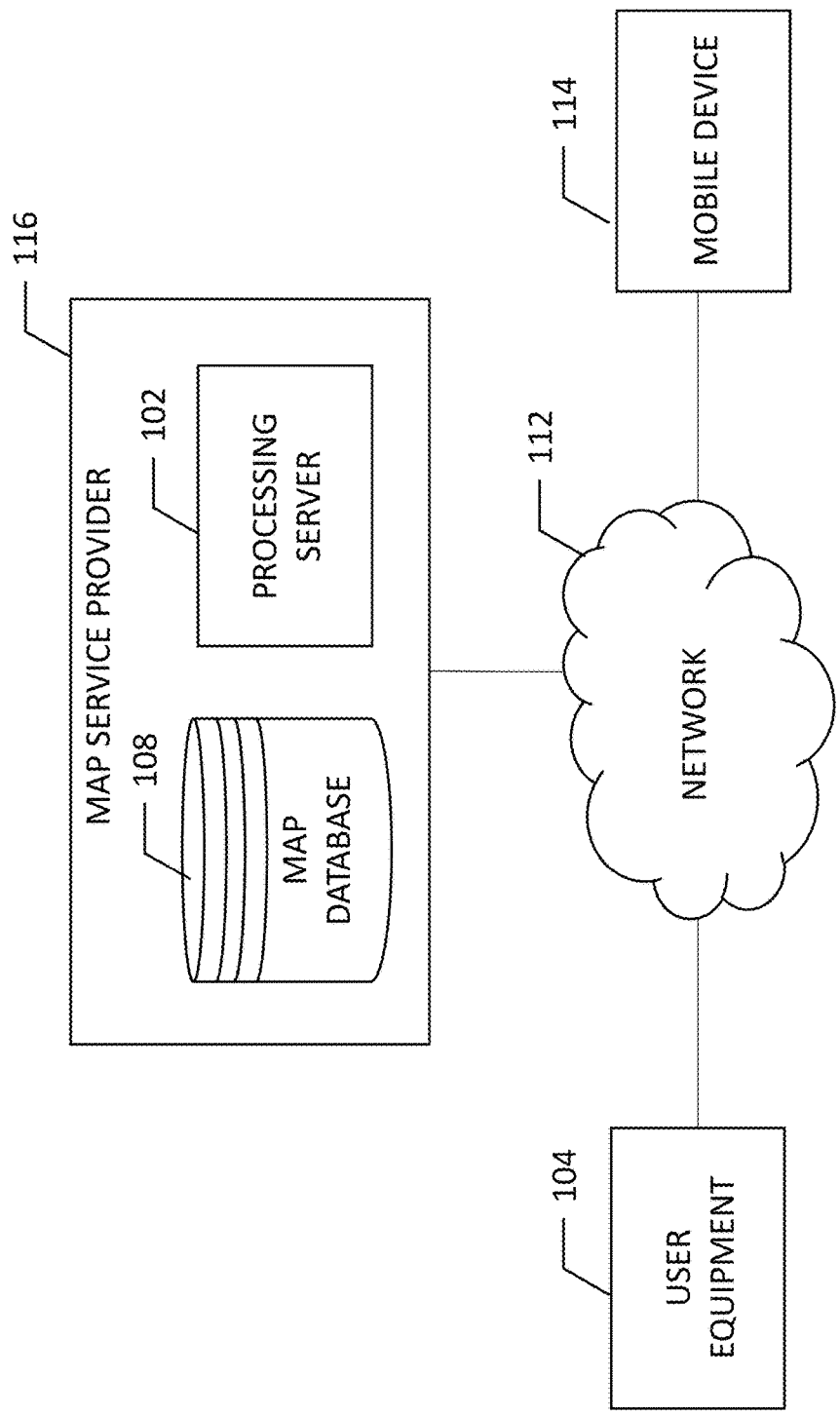
Figure 2:
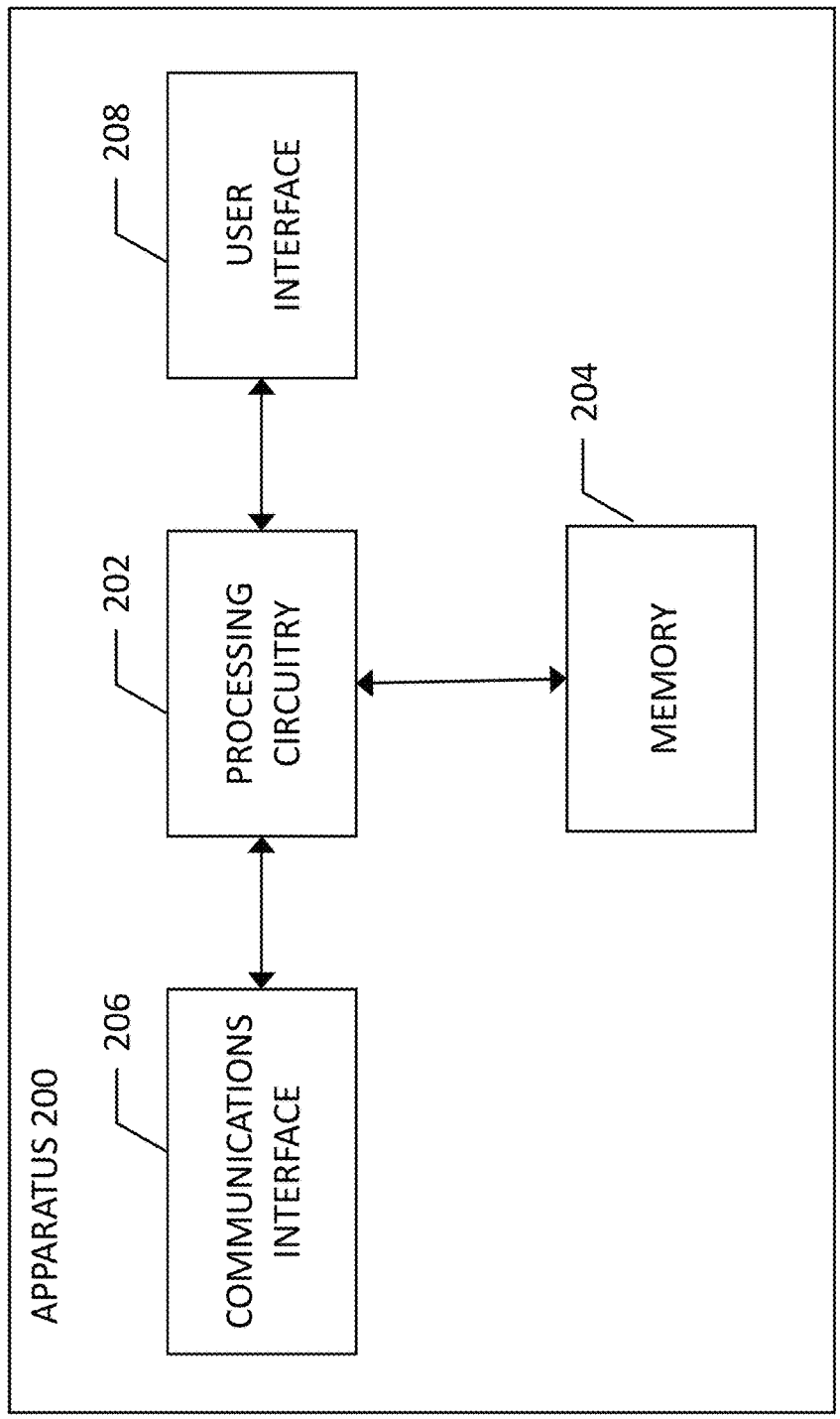
Figure 3:
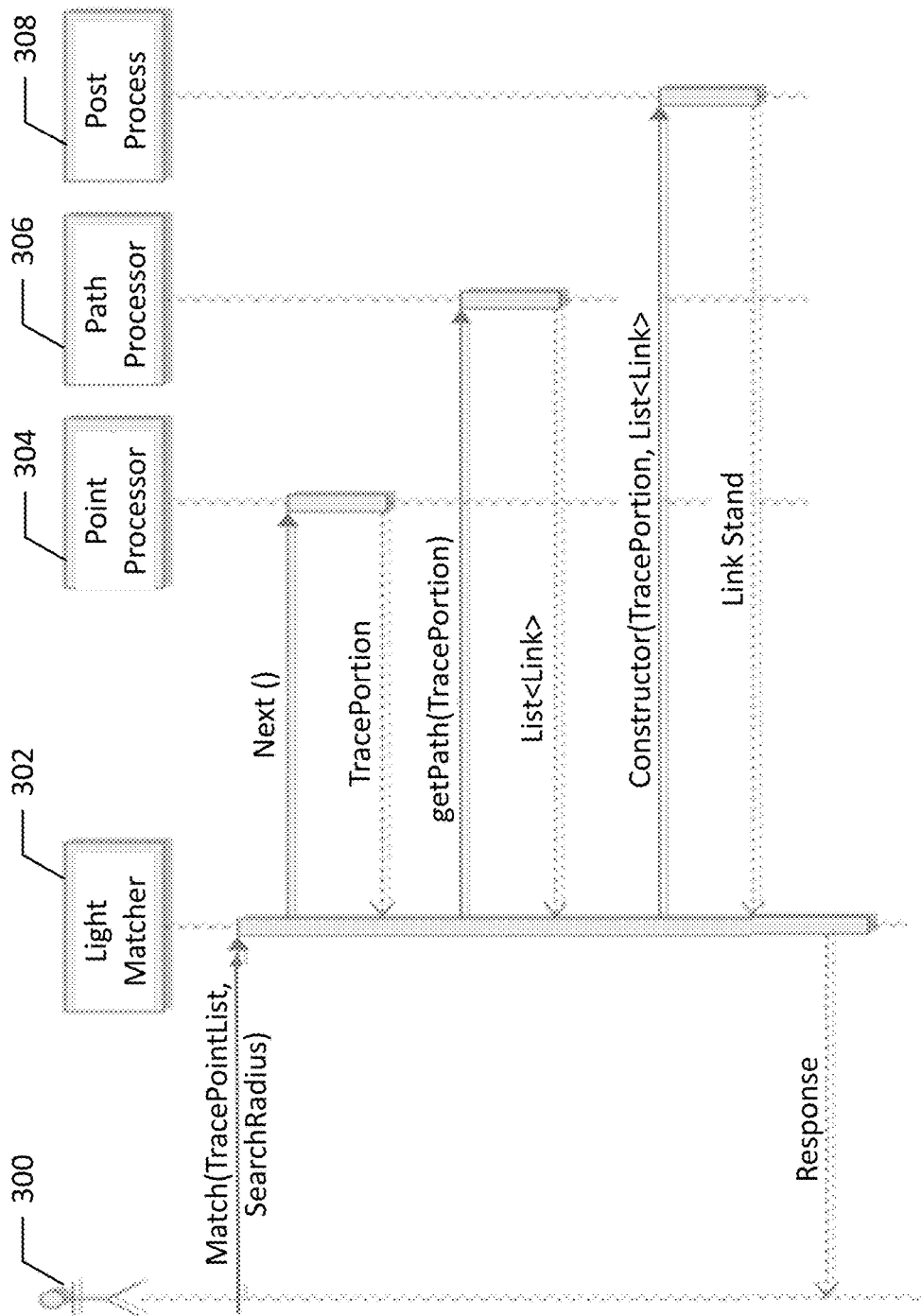
Figure 4:
Figure 5:
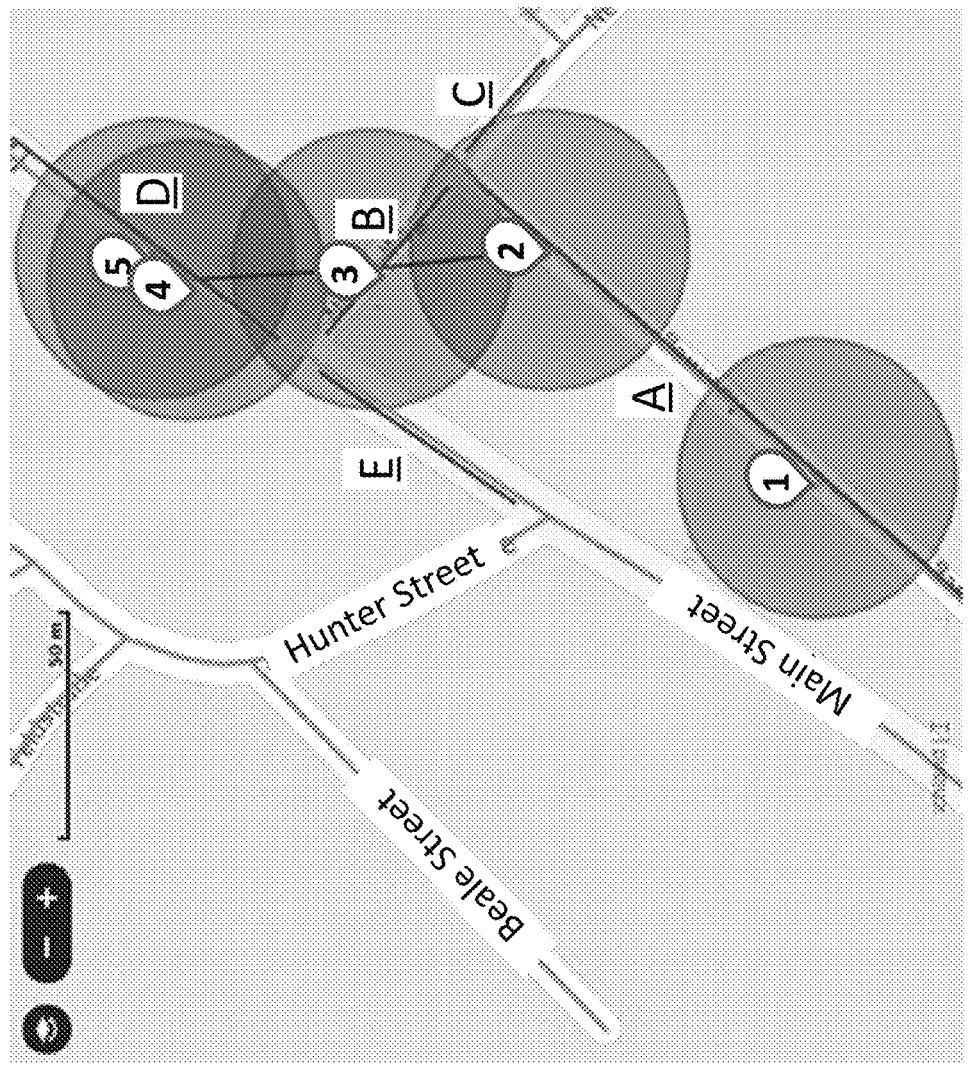
Figure 6:
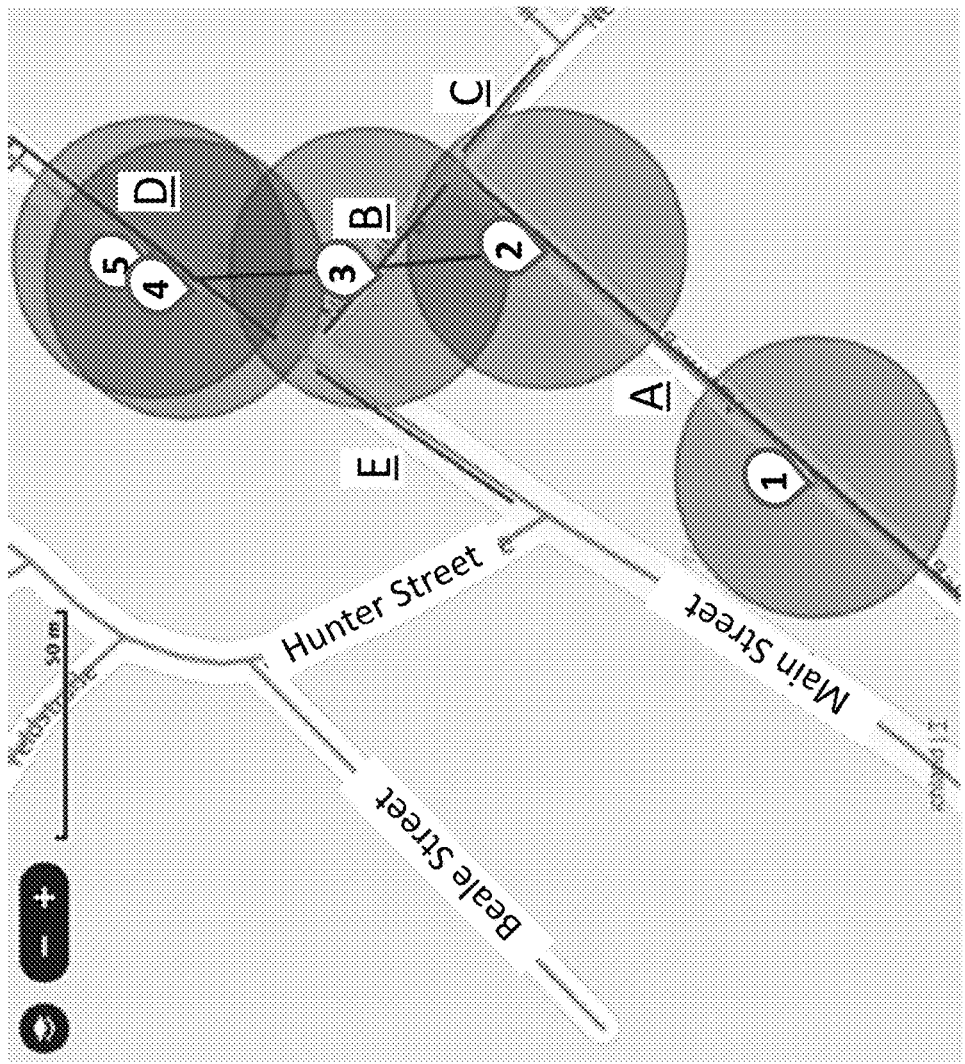
Figure 7:
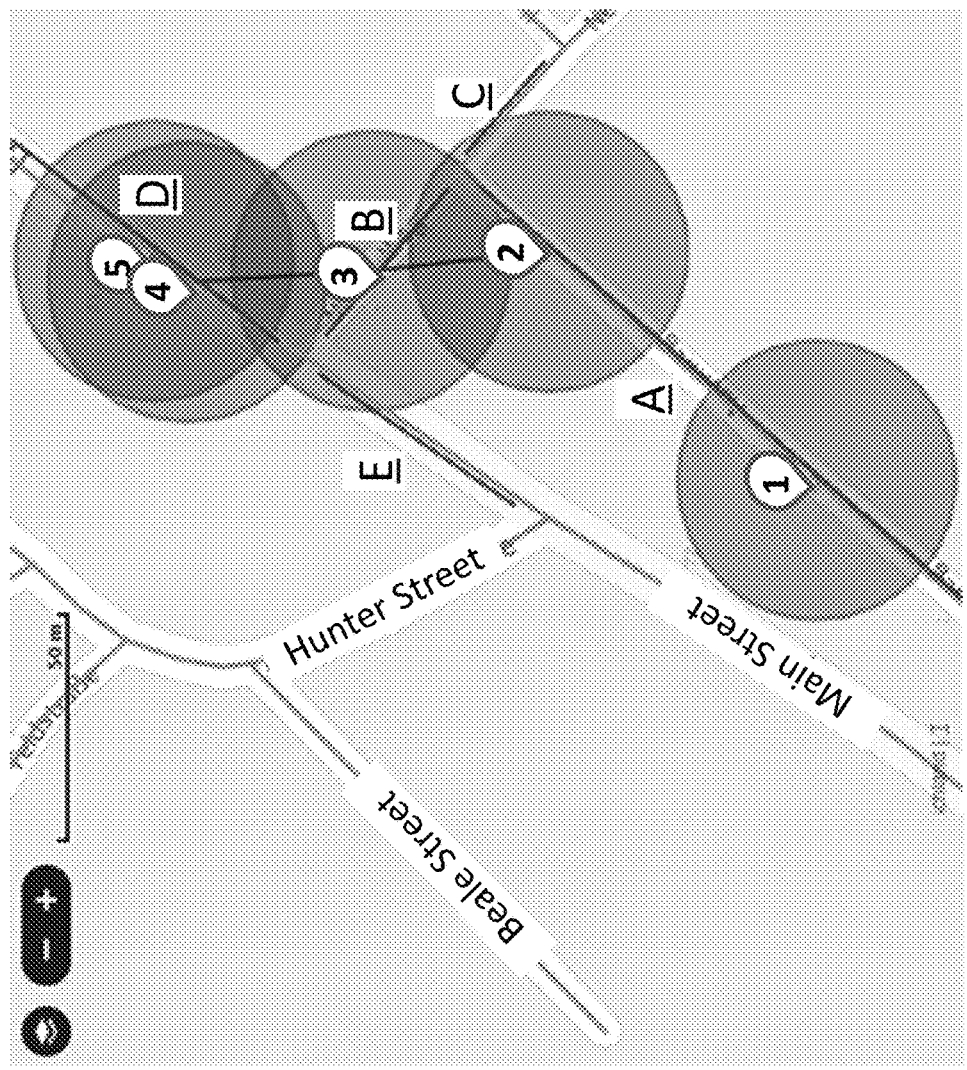
Figure 8:
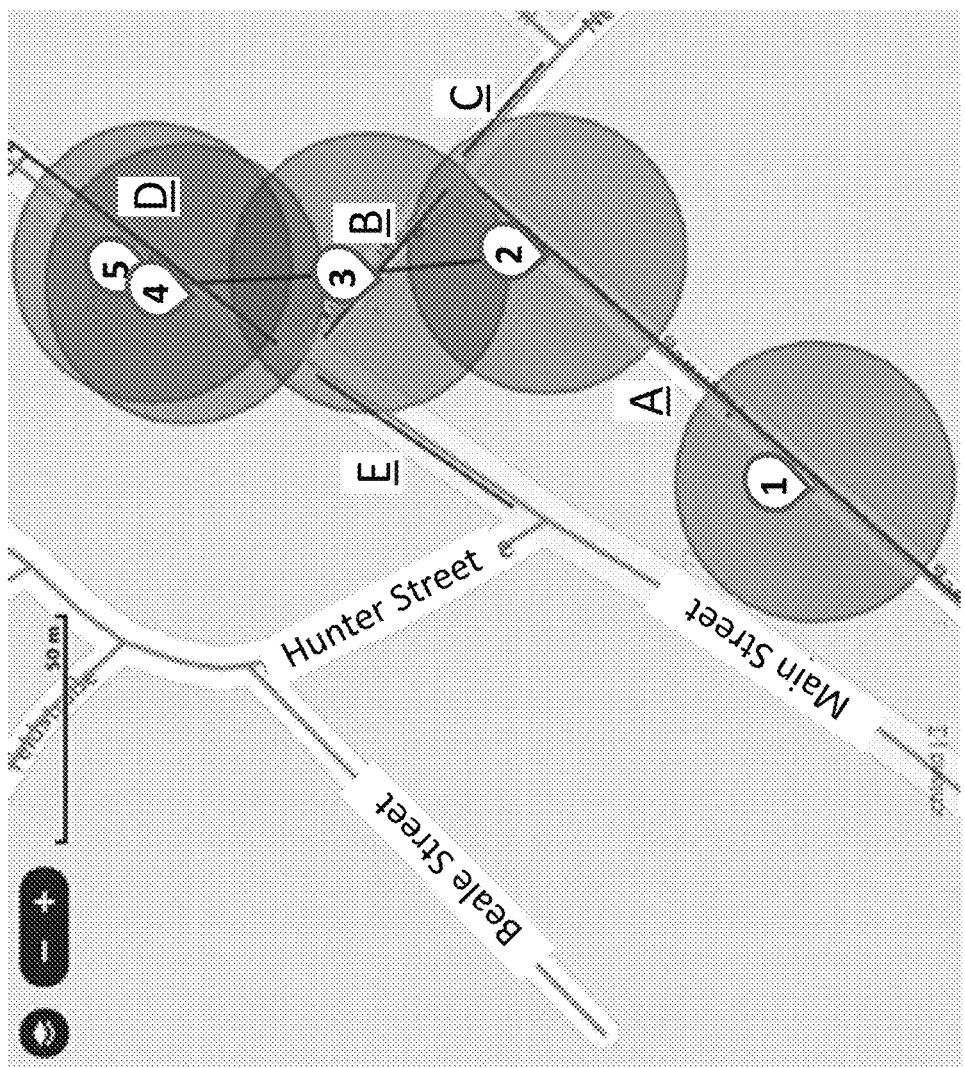
Figure 9:
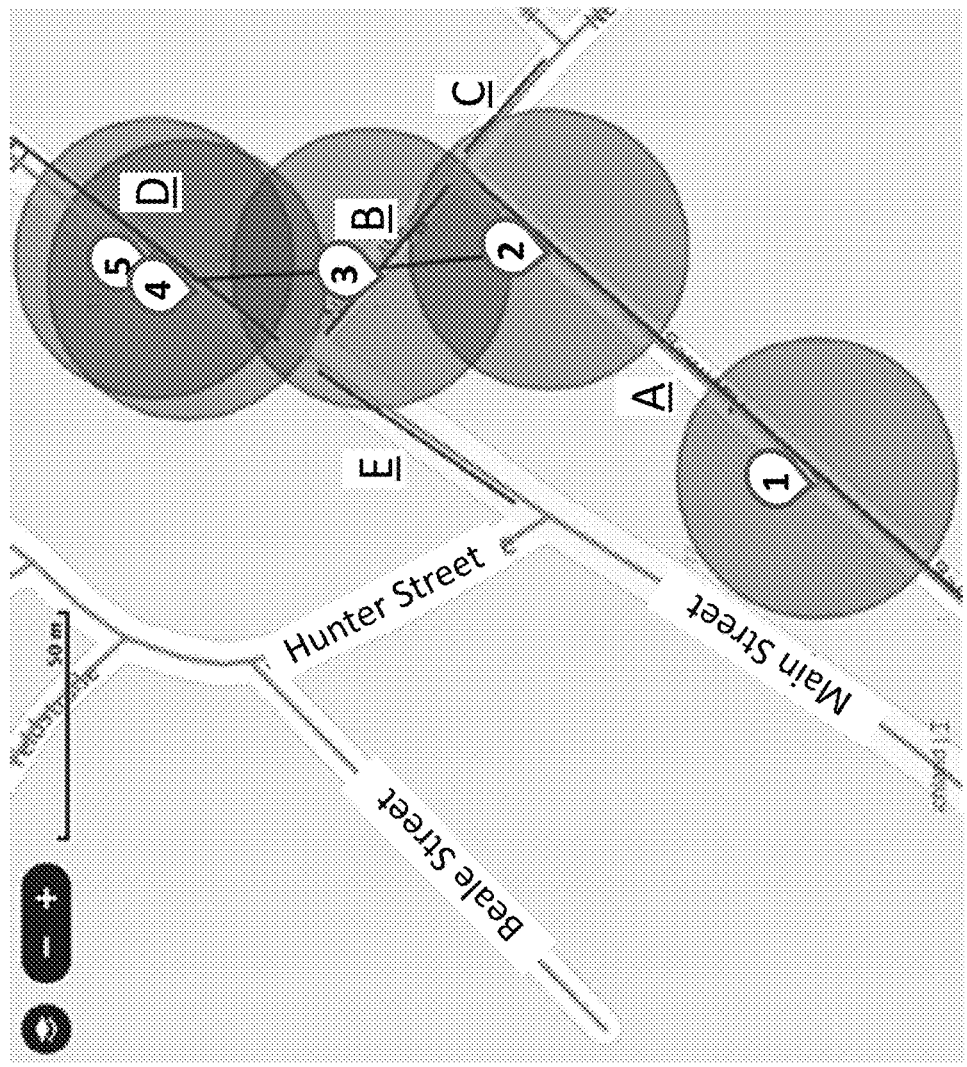
Figure 10:
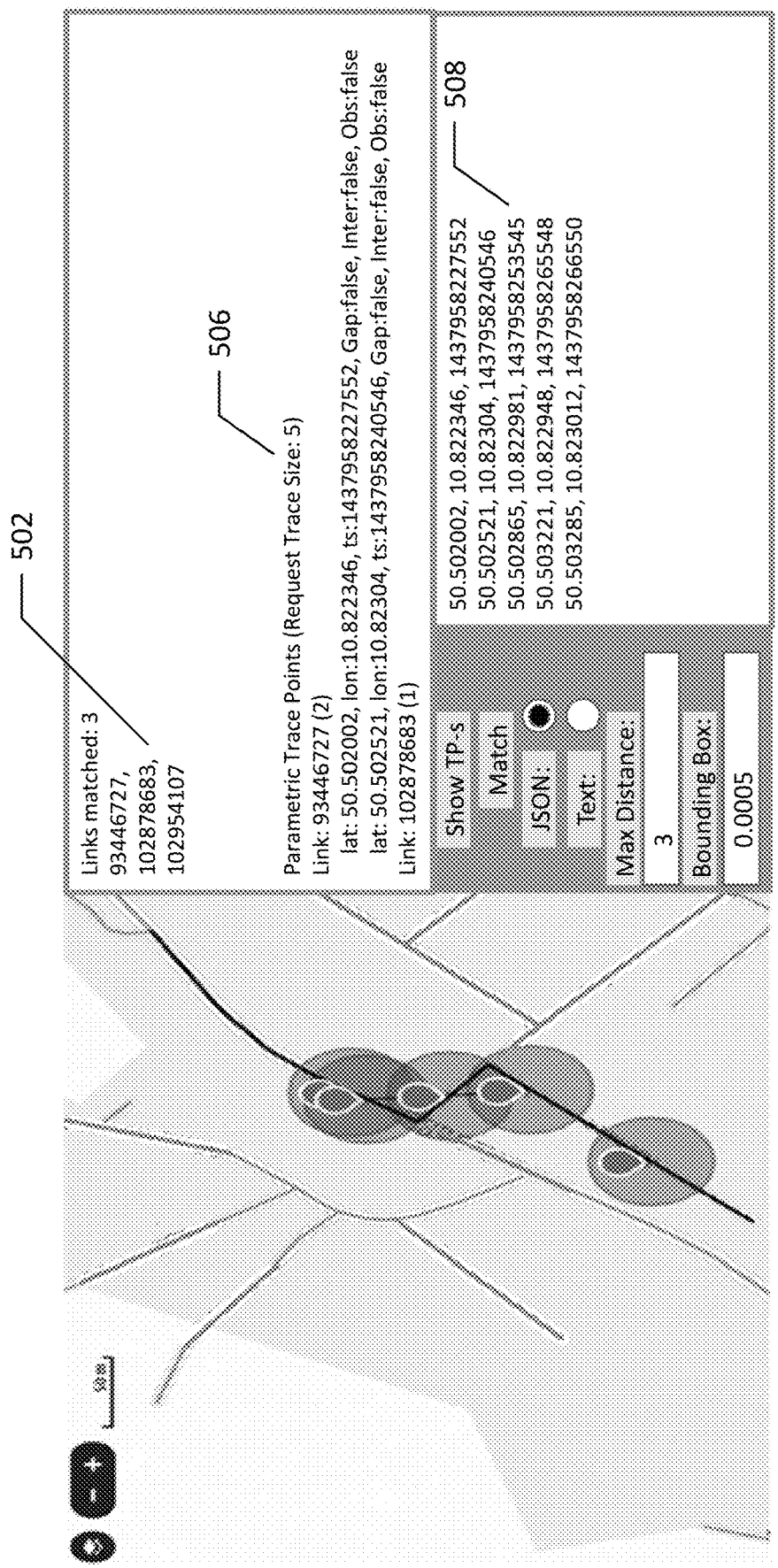
Figure 11:
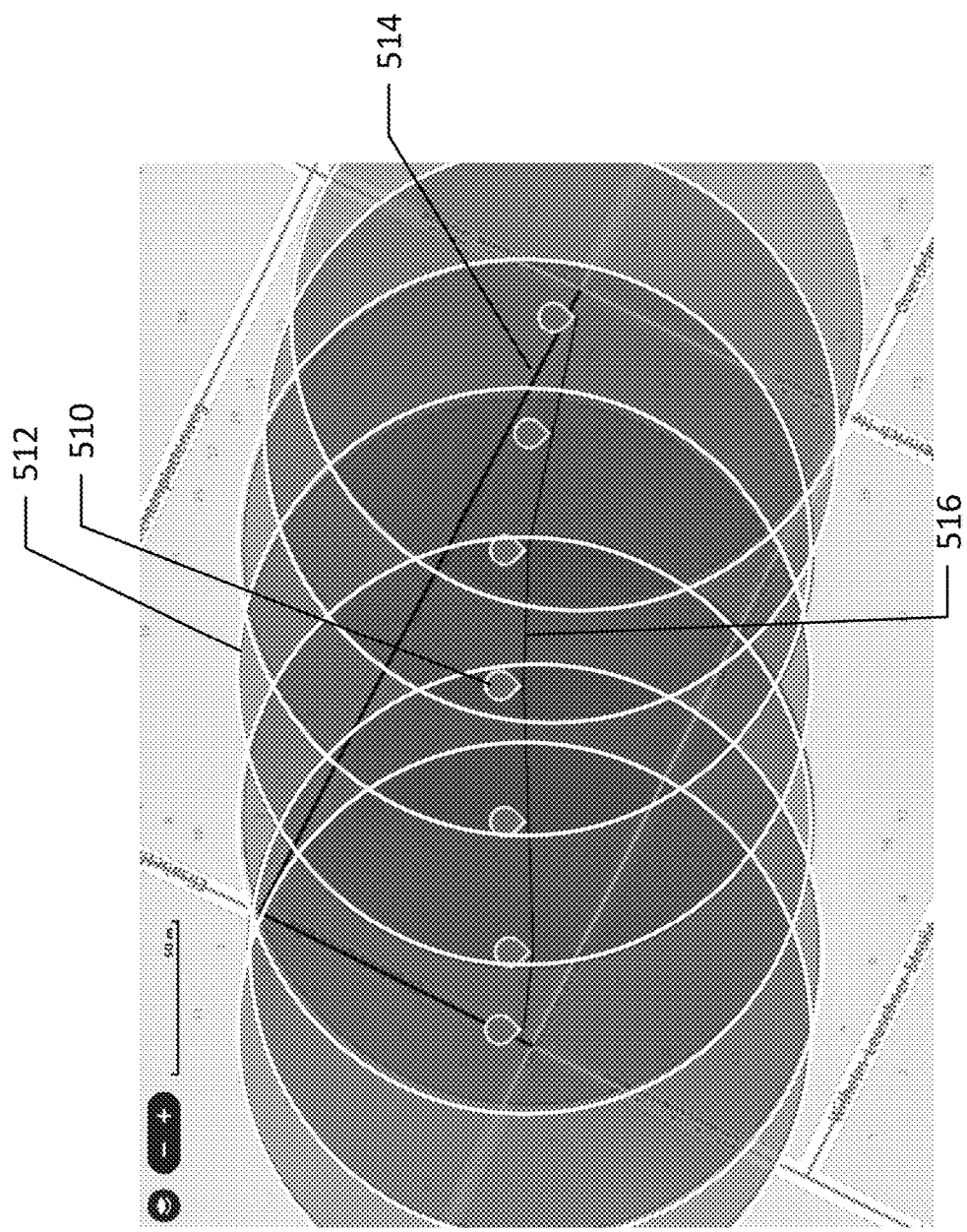
Figure 12:
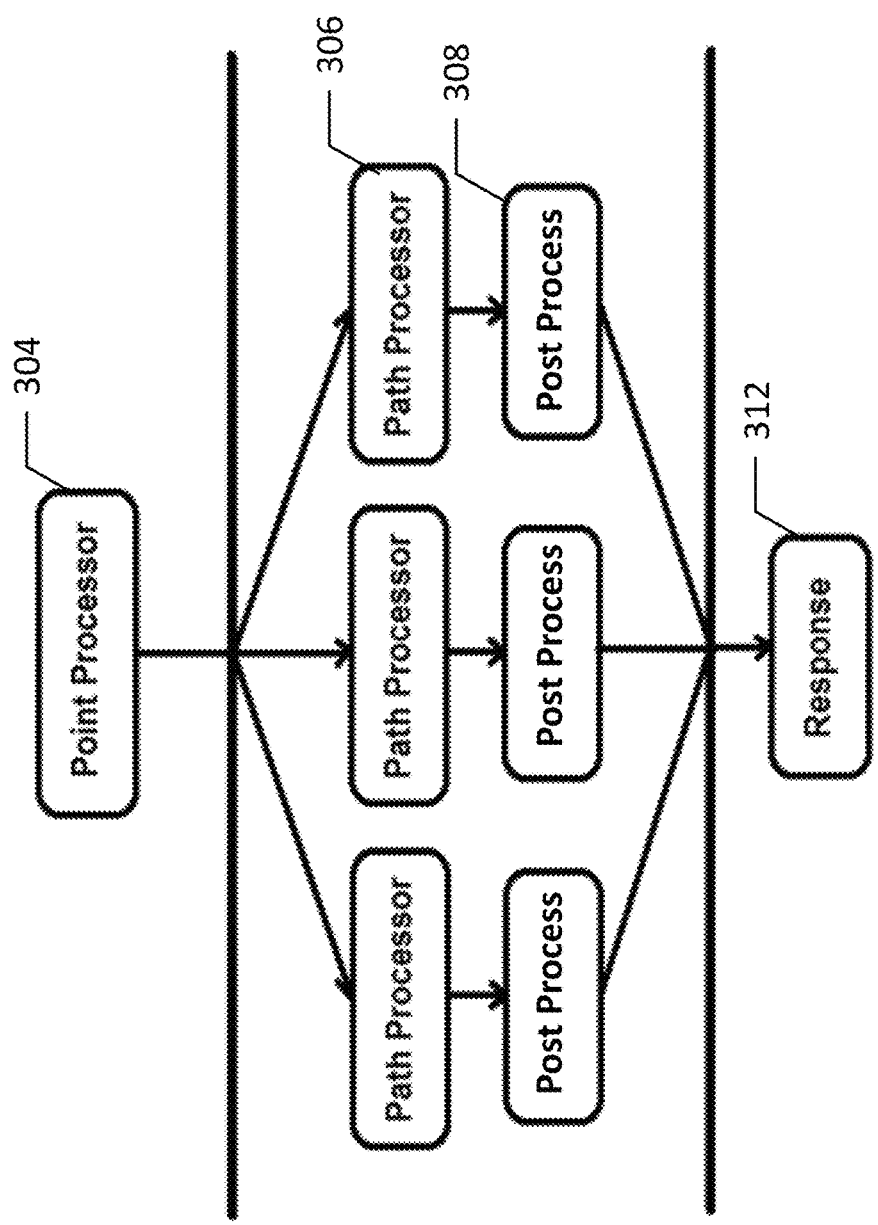
Figure 13:
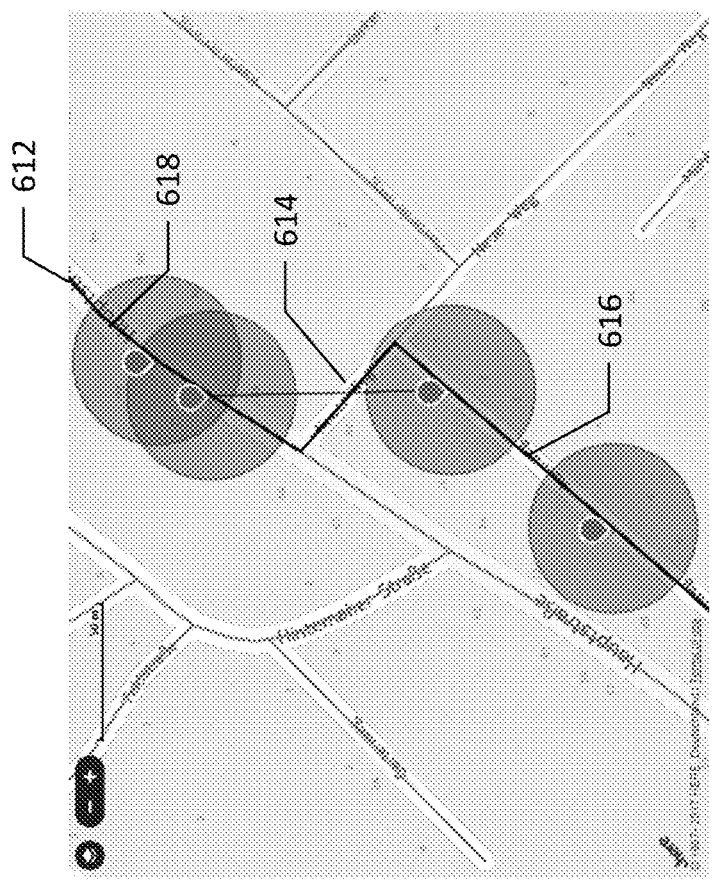
Figure 13:
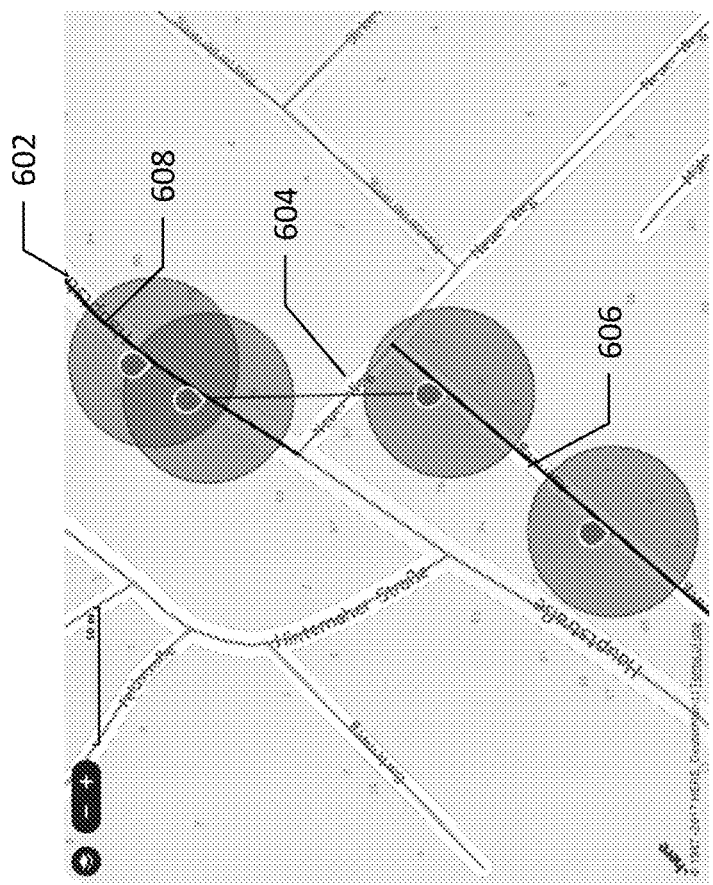
Figure 14:
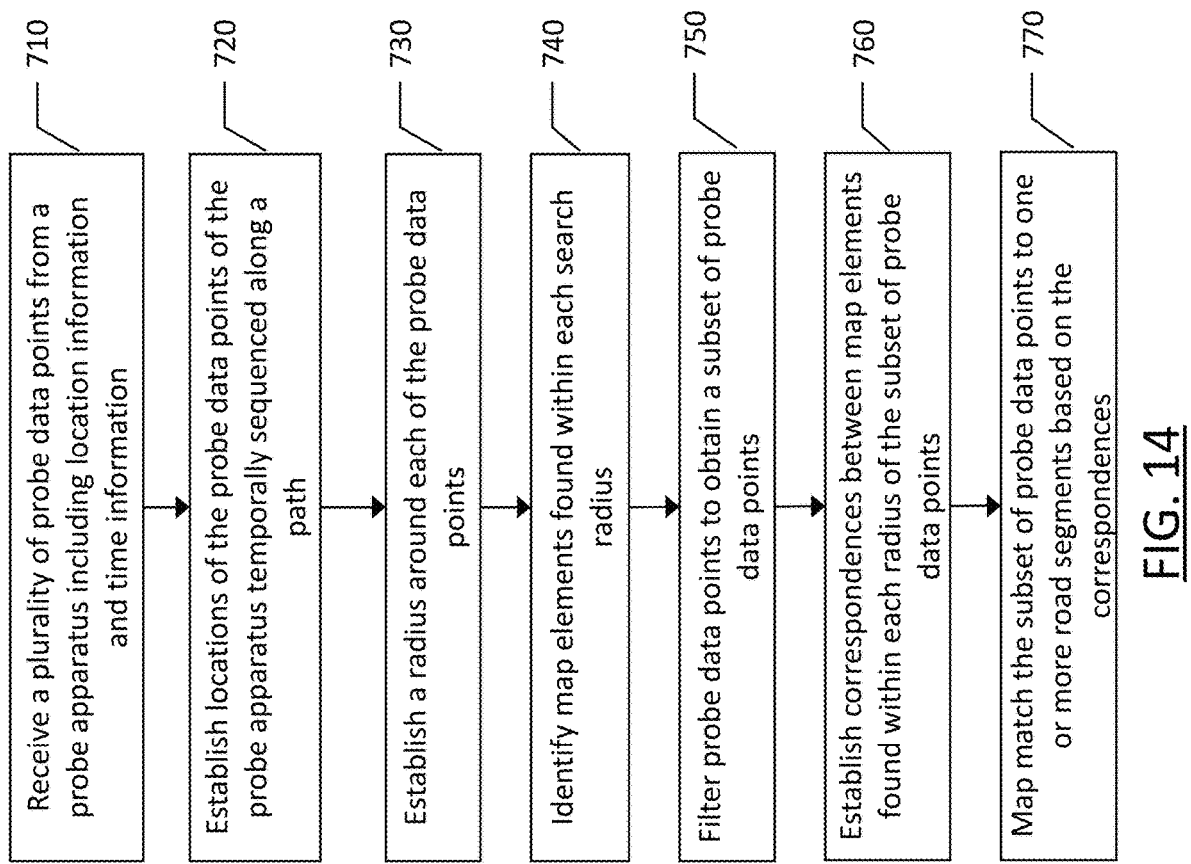

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for map matching probe data points to map elements in accordance with an example embodiment described herein;

FIG. 3 is a message flow chart for map matching probe data points to map elements forming a path according to example embodiments of the present disclosure;

FIG. 4 depicts a map of a region including probe data points and respective radii about each probe data point according to an example embodiment of the present disclosure;

FIG. 5 illustrates the mapped region of FIG. 4 with a filtered subset of probe data points and their respective radii according to an example embodiment of the present disclosure;

FIG. 6 illustrates the mapped region and probe data points of FIG. 5 as the points are map matched according to algorithms described herein with respect to the present disclosure;

FIG. 7 illustrates the mapped region and probe data points of FIG. 5 as the points are map matched according to algorithms described herein with respect to the present disclosure;

FIG. 8 illustrates the mapped region and probe data points of FIG. 5 as the points are map matched according to algorithms described herein with respect to the present disclosure;

FIG. 9 illustrates the mapped region and probe data points of FIG. 5 as the points are map matched according to algorithms described herein with respect to the present disclosure;

FIG. 10 depicts the map matched probe data points and associated path resulting from the map matching process described with respect to FIGS. 5-9 according to an example embodiment of the present disclosure;

FIG. 11 illustrates path ranking for map matching according to an example embodiment of the present disclosure;

FIG. 12 depicts the parallel processing of subdivided portions of a path according to an example embodiment of the present disclosure;

FIG. 13 illustrates path based map matching used to fill gaps in a path according to an example embodiment of the present disclosure; and FIG. 14 is a flowchart of a method for map matching according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for map matching location data to a map in an efficient manner that reduces matching time and processing requirements to map-match batches of location data points from a path. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and networks of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Further, crowd-sourced data from vehicles traveling along the road links in the road network may provide information relating to their respective speed of travel, which may inform the map services provider with respect to vehicle speeds, such as lane level vehicle speed profiles.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for detecting changes in road traffic conditions. The apparatus may include or otherwise be in communication with a processing circuitry 202, a memory device 204, a communication interface 206, and a user interface 208. In some embodiments, the processing circuitry (and/or co-processors or any other processing circuitry assisting or otherwise associated with the processing circuitry) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present invention. For example, the memory device could be configured to buffer input data for processing by the processing circuitry. Additionally or alternatively, the memory device could be configured to store instructions for execution by the processing circuitry.

The processing circuitry 202 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor specific device (for example, a mobile terminal or a fixed computing device) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry comprising the processor may be configured to control one or more functions of one or more user interface elements through computer program instructions (for example, software and/or firmware) stored on a memory accessible to the processing circuitry (for example, memory device 204, and/or the like.

Map service providers 116 as described herein may recognize probe data as being from a vehicle or from a pedestrian traveling along a defined map element (e.g., a road or walkway), such that even if the probe data indicates that the probe location is offset from a map element, the map service provider may be able to map-match the probe data to the map element along which the probe is traveling. While map matching may, in some circumstances, be trivial to match a probe to a map element when there are no alternatives available, map matching often requires distinguishing a map element along which a vehicle or pedestrian is traveling from other potential map elements.

Map matching of probe data points to map elements such as road segments may be challenging and may require substantial processing capacity and time. However, example embodiments described herein reduce the processing burden and vastly improve the time required to map match probe data points to map elements. Embodiments of the algorithm described herein provide an efficient way to segment a batch of probe data points into subsets of geographic coordinates (latitude and longitude) that can be processed in parallel. This can be done while the feed of probe data is dense, relatively accurate, and the batch of probe data points belong to the same path arranged by timestamp. Example algorithms do not replace existing map matching algorithms, but can be used before conventional map matching algorithms or in parallel to improve the performance of map matching by reducing volume of probe data points that require map matching through more traditional means.

Embodiments described herein use an R-Tree with map elements, such as road segments for a region. Probe data points are received for a probe apparatus (e.g., mobile device 114) traveling along a path and the latitude and longitude of the probe data points are identified and correlated to the map data of the map services provider 116. These probe data points may or may not lie along a map element. As will be appreciated from the disclosure provided herein, a probe data point may have a geographic location that falls on a first map element, while that probe data point may become map matched to a different map element based on analysis provided herein. The path may include a series of probe data points in temporal sequence of when the probe data points were acquired. The path is from a single probe traveling along a one or more map elements. For each probe data point, the map elements found within a predefined radius of the probe data point geographic location may be identified. The probe data points may be filtered through eliminating probe data points for which the map elements found within a predefined radius of the probe data point are identical. Thus, the algorithm described herein can reduce the number of probe data points used in the map matching process through elimination of what are determined to be probe data points redundant along a common map element.

The remaining probe data points may be broken into subsets of sequential geographic coordinates. The probe data point subsets may be broken at break points in the path, where the break points are identified based on one of three criteria. If a probe data point has no map elements within the predefined radius, the probe data point is classified as "off road" or "off map element" and the probe data point may be removed from the map matching process. This eliminated probe data point may be a break point between two subsets of sequential probe data points. Another probe data break point may be established as a probe data point for which there is only one map element within the predefined radius of the geographic location of the probe data point. A further probe data break point may be established when the probe data point has no map elements in common with a next probe data point in the sequence of the path. These probe data break points may serve as the breaks in the probe data path for which subsets of probe data points may be established, and each subset may then be processed in parallel.

Each subset of probe data points may then be processed through building a path of map elements from the common map elements around (e.g., within the predefined radius of) sequential probe data points. When those paths converge to a single road, a decision should be made as only one path shall be selected. This selection process is performed through ranking or prioritizing using a prioritization technique or weighting to be used. Once each subset of probe data points is processed, the subsets may be concatenated to return a single, map matched path as the result of the map matching process.

The pre-matching strategy described herein includes the following classes: Light Matcher, Point Processor, Path Processor, and Post Process. The interaction diagram for these classes is illustrated in FIG. 3 which depicts the collaboration of those functions beginning with the Map Matching request received from the calling/client applications and ending with a call response. As shown in FIG. 3, the trace point list is received at the Light Matcher 302 from a client 300. A search radius about each trace point is also specified within the request. The point processor 304 receives and processes the trace point list to filter the trace points that are contiguous in time, forming an ordered sequence, but have the same geometry which indicates that the probe device did not move. The point processor 304 finds map elements, such as using map database 108 of map service provider 116 close to each probe data point defined by the selected search radius. The point processor 304 then filters the probe data points again, only keeping the probe data points where there are changes in the nearby links, as will be detailed further below.

FIG. 4 illustrates an example embodiment of the plurality of probe data points from a probe device as it proceeds along a path in map 400. As shown, each probe data point 402 is represented by a geographic location, having a longitude and latitude, and a search radius 404 about each probe data point 402. The search radius may be established by a user or may be determined based on the density of map elements within a region corresponding to the probe data points. For example, in an area of dense map elements where there may be a dense network of road segments, the radius may be chosen as smaller relative to an area of sparse map elements where roads travel long distances without a high concentration of other map elements. In the example embodiment of FIGS. 4-9, a search radius of about 33 meters or about 36 yards is selected.

FIG. 5 illustrates the map 400 with the probe data points filtered by the point processor 302. Each probe data point removed between FIGS. 4 and 5 includes within the search radius only map elements that are identical to the probe data point before it in the sequence. For example, all probe data points between probe data point 1 and probe data point 2 in FIG. 5 included only road segment A within their search radius. Similarly, each probe data point between probe data point 2 and probe data point 3 included road segments A, B, and C within their search radius. As such, the point processor 302 filtered these probe data points from map matching, thereby substantially reducing the quantity of probe data points requiring map matching.

FIG. 5 illustrates the raw probe data points 402 of FIG. 4 filtered by point processor 304. The path processor 306 may find common links between probe data points such that coincidences are identified as "confirmed path" values if there is a common node between the links found in common between probe data points. FIG. 6 illustrates the map elements found within the search radii of probe data Point 1 and Point 2. The map elements of the illustrated example are road segments, where the road segments have road segment identifiers or numerical identifiers that uniquely identify the road segment. As shown, Point 1 includes only one map element, road segment A having unique ID 93446727. Point 2 has three map elements within the search radius, including road segments A, B, and C. As the unique identifier of road segment A is common between Point 1 and Point 2, road segment A is established to be a confirmed path along which the probe apparatus is traveling or has traveled. The potential paths for the probe apparatus, as shown in FIG. 6, is road segment A (e.g., if the probe apparatus has stopped on road segment A and ended the trip), road segments A to B, and road segments A to C. Road segments A and B or A and C are potential paths because they satisfy two necessary criteria: both road segments B and C are found within the search radius of Point 2, and both road segments B and C are reachable from road segment A, as in there is a node or intersection connecting them.

FIG. 7 depicts the progression of the present disclosure with respect to map matching the path. As shown in FIG. 6, the confirmed path of the probe apparatus begins with road segment A. The common map elements between Point 2 and Point 3 are then compared. As shown, Point 2 includes road segments A, B, and C, while Point 3 includes road segments D, E, and B. As road segment B is common between Point 2 and Point 3, and as road segment B shares a node with road segment A, road segment B becomes a confirmed road segment and the confirmed path grows to road segment A to road segment B. Notably, there are no other common road segments between Point 2 and Point 3 such that there is no ambiguity with respect to establishing road segment B as a confirmed part of the path of the probe apparatus. The potential paths at this point become road segment A to B and ending at B, road segment A to B to E, and road segment A to B to D.

FIG. 8 illustrates the progression of analysis including identifying common road segments or map elements between Point 3 and Point 4. As shown, Point 3 and Point 4 have two map elements in common: road segment B and road segment D. This presents a degree of ambiguity as the path of the probe apparatus could be along confirmed path of road segment A to B, or along the confirmed path of road segments A to B to D. These two confirmed paths are also the potential paths given the map elements found within the search radii of probe Point 3 and Point 4.

The analysis may continue with additional probe data points in the temporal sequence, such as probe Point 5 as shown in FIG. 9. As illustrated, probe Point 5 has in common with probe Point 4 only road segment D, thereby confirming road segment D as part of the path, which also eliminates the potential path of only road segments A and B, as road segment D has now been positively confirmed as taken by the probe apparatus. Thus, the confirmed path becomes road segment A to B to D, and there are no potential paths.

Referring back to FIG. 3, once the path processor has established the confirmed path, point-based map matching may be carried out through any available technique. According to an example embodiment as illustrated and described herein, the Post Process 308 may employ an example technique of crossing the original probe data point list against the identified path (road segment A to B to D) to calculate distance, the projected point on the matched road segment, and relative position (from 0 to 1) of the projected point on the matched road segment, also known as a T-value. FIG. 10 illustrates the process performed by the Post Process 308, where the three links matched (A, B, and D) are identified by their unique identifiers at 502. The parametric trace points shown at 506 of FIG. 10 identify the location of the probe data points with latitude and longitude, along with the link or road segment along which they are found. As shown, road segment A, identified by unique identifier 93446727, includes two probe data points, with their geographical positions illustrated at 506. The list of probe data points or trace points is shown in window 508 of FIG. 10.

As noted above, there can be some degree of ambiguity when identifying road segments along which the probe data points are map matched. For example, FIG. 8 shows two confirmed paths. While the ambiguity of FIG. 8 was resolved with a subsequent probe data point positively identifying one of the two confirmed paths as more correct, such a subsequent probe data point may not always be available to resolve the conflict. As such, a ranking or weighting may be used when the algorithm must decide between two or more confirmed paths.

The Path Processor 306 of FIG. 3 may use a ranking to weight each of the two or more confirmed paths and identify the most appropriate or most likely path. Embodiments may include two weights added to the candidates for ranking: the first weight may be awarded based on traversability (e.g., a penalty to paths where the direction of flow of the path is counter to that of the temporally sequenced probe data points), and the second weight may be calculated through average distance from the probe data points to one of the candidate paths. While these two examples of weighting may be implemented in example algorithms, other ranking/weighting methods may be used to improve performance and precision of the map matching process described herein.

As shown in FIG. 11, a series of probe data points 510 and their corresponding radii 512 are illustrated traversing a path. As shown, both road segment 514 and 516 fall within each search radius of the probe data points, such that both road segments 514 and 516 are confirmed path segments. However, the probe apparatus can only be traversing one of these road segments given the sequence of probe data points. According to the illustrated embodiment, road segment 516 is closer to the probe data points such that road segment 516 is more heavily weighted and higher ranked than road segment 514, such that road segment 516 is identified as the more appropriate confirmed path.

According to some embodiments described herein, resolving ambiguity with respect to road segments may be performed by a separate map matcher invoked to use more computationally intense methods of map matching. According to such embodiments, the pre-map matching process described above may map match probe data points for which the pre-map matching is compatible and unambiguous, while leaving any ambiguities to a map matching algorithm using different techniques which may resolve the ambiguities.

As described above, embodiments of the present disclosure improve the efficiency with which a sequence of probe data points are map matched to a path through the elimination of duplicative probe data points that do not add valuable information to establishing the path. Further, embodiments provide for parallel processing of sub segments of probe data points within the sequence to further improve the efficiency with which paths are established. In order to process portions of a sequence of probe data points in parallel, the sequence of probe data points must be subdivided into a plurality of matches or sub segments. Subdividing the sequence of probe data points may be performed by establishing break points in the data. Those break points may be established based on predetermined criteria that render the selected probe data break points as suitable for sub-division.

A first criteria that may be used to establish a break point is when a probe data point includes only a single map element within the search radius. Point 1 of the example embodiment of FIG. 5 illustrates such a probe data point, where the only map element within the search radius of Point 1 is road segment A. A second criteria for establishing a break point in the probe data sequence is a probe data point for which there are no map elements within the search radius. Such a point is identified as an "off-road" probe data point. This probe data point may be erroneously reporting location, actually off-road in an environment, or in a feature not established as a map element, which may include a parking garage, parking lot, restaurant parking lot, retail establishment parking lot, etc. The third criteria that may be used for establishing a break point in the probe data may include where a set of nearby map elements within the search radius have no common map elements with the probe data points adjacent in sequence. Such criteria establishes a gap in the path for which map matching may be hindered. Each of these criteria may be used independently to identify break points in the probe data, and in the event too many potential break points are established, the break points can be ranked or weighted in part based on a priority of the break point criteria, or whether they satisfy more than one of the break point criteria.

FIG. 12 illustrates parallel processing of sub-segments of the sequence of probe data points when sub-divided at break points. As shown, the Point Processor 304 may establish the break points and sub-divide the sequence of probe data points into sub-segments. In the illustrated embodiment, three sub-segments may be established, and each of the three sub-segments may be processed in parallel by the Path Processor 306 and the Post Process 308 providing a response 312 to the map matching request.

Embodiments described herein may optionally include path based map matching that can resolve issues when a gap is present within a sequence of probe data points that have been map matched to road segments of a map. As shown in FIG. 13, a path 602 is generated where a gap 604 exists between path segments 606 and 608. When path based map matching is not enabled, the gap at 604 is unresolved, and two non-contiguous path segments exist. However, when path based map matching is enabled, a matcher may implement another map matching algorithm to find road segments in the gap(s) or use a route generation algorithm to establish a path of road segment(s) 614 between path segments 616 and 618 to generate a complete path 612.

FIG. 14 illustrates a flowchart depicting a method according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 14 illustrates a flowchart of a method for map matching probe data points to map elements in a more efficient and effective manner than presently available by map matching probe data points from the path of a probe apparatus in parallel subdivisions as established through algorithms described herein. Probe data points from a probe apparatus including location information and time information are received at 710. Locations of the probe data points are established at 720 temporally sequenced along a path. A radius is established at 730 around each of the probe data points. Map elements found within each search radius are identified at 740. Probe data points are filtered at 750 to obtain a subset of the probe data points. Correspondences are established at 760 between map elements found within each radius of the subset of probe data points. The subset of probe data points is map matched at 770 to one or more road segments based on the correspondences.

In an example embodiment, an apparatus for performing the method of FIG. 14 above may comprise a processor (e.g., the processing circuitry 202) configured to perform some or each of the operations (710-770) described above. The processing circuitry may, for example, be configured to perform the operations (710-770) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-770 may comprise, for example, the processing circuitry 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a plurality of probe data points, the plurality of probe data points received from a probe apparatus comprising one or more sensors, wherein the plurality of probe data points comprise location information associated with the probe apparatus and time information associated with the location information;
   establishing locations of the plurality of probe data points of the probe apparatus temporally sequenced along a path;
   establishing radiuses around the plurality of probe data points;
   identifying, from map data, map elements found within the radiuses;
   filtering the plurality of probe data points to obtain a subset of probe data points, wherein filtering the plurality of probe data points to obtain the subset of probe data points comprises filtering out excluded probe data points of the plurality of probe data points for which the map elements found within a radius of a respective excluded probe data point are the same as the map elements found within a radius of a preceding probe data point to obtain the subset of probe data points;
   establishing correspondences between the map elements found within the radiuses of probe data points of the subset of probe data points;
   map matching the subset of probe data points to one or more road segments based on the correspondences between the map elements found within the radiuses of the probe data points of the subset of probe data points; and
   generating a path of the probe apparatus along the one or more road segments.

2. The method of claim 1, wherein establishing the correspondences between the map elements found within the radiuses of the probe data points of the subset of probe data points comprises:
   identifying the map elements within a radius of a respective probe data point of the subset of probe data points that match the map elements within a radius of a subsequent probe data point of the subset of probe data points.

3. The method of claim 2, wherein map matching the subset of probe data points to one or more road segments based on the correspondences between the map elements found within the radiuses of the probe data points of the subset of probe data points comprises:
   map matching a first probe data point to a first map element in response to the first map element being an only map element common between a radius of the first probe data point and a radius of a next probe data point in the subset of probe data points.

4. The method of claim 1, further comprising, after filtering the probe data points:
   establishing one or more probe data points as breakpoints; and
   subdividing the subset of probe data points into a plurality of subset divisions of probe data points, wherein the subset is divided at breakpoint probe data points.

5. The method of claim 4, wherein establishing one or more probe data points as breakpoints comprises:
   identifying probe data points that meet at least one criterion for establishing a breakpoint, wherein the at least one criterion comprises, for a probe data point, at least one of:
   only a single map element within a radius of the probe data point;
   no map elements within the radius of the probe data point; or
   no map elements in common with a next sequential probe data point.

6. The method of claim 4, wherein map matching the subset of probe data points to one or more road segments based on the correspondences between the map elements found within the radiuses of the probe data points of the subset of probe data points comprises:
   map matching the subset divisions of probe data points in parallel with one another to one or more road segments based on the correspondences between the map elements found within the radiuses of the probe data points of the subset division of probe data points.

7. An apparatus comprising processing circuitry and at least one memory including computer program code, the at least one memory and computer program code configured to, with the processing circuitry, cause the apparatus to at least:
   receive a plurality of probe data points, the plurality of probe data points received from a probe apparatus comprising one or more sensors, wherein the plurality of probe data points comprise location information associated with the probe apparatus and time information associated with the location information;
   establish locations of the plurality of probe data points temporally sequenced along a path;
   establish radiuses around the plurality of probe data points;
   identify, from map data, map elements found within the radiuses;
   filter the plurality of probe data points to obtain a subset of probe data points, wherein filtering the plurality of probe data points to obtain the subset of probe data points comprises filtering out excluded probe data points of the plurality of probe data points for which the map elements found within a radius of a respective excluded probe data point are the same as the map elements found within a radius of a preceding probe data point to obtain the subset of probe data points;

establish correspondences between the map elements found within the radiuses of probe data points of the subset of probe data points;

map match the subset of probe data points to one or more road segments based on the correspondences between the map elements found within the radiuses of the probe data points of the subset of probe data points; and generate a path of the probe apparatus along the one or more road segments.

8. The apparatus of claim 7, wherein causing the apparatus to establish the correspondences between the map elements found within the radiuses of the probe data points of the subset of probe data points comprises causing the apparatus to:

identify the map elements within a radius of a respective probe data point of the subset of probe data points that match the map elements within a radius of a subsequent probe data point of the subset of probe data points.

9. The apparatus of claim 8, wherein causing the apparatus to map match the subset of probe data points to one or more road segments based on the correspondences between the map elements found within the radiuses of the probe data points of the subset of probe data points comprises causing the apparatus to:

map match a first probe data point to a first map element in response to the first map element being an only map element common between a radius of the first probe data point and a radius of a next probe data point in the subset of probe data points.

10. The apparatus of claim 7, further comprising, after filtering the probe data points, causing the apparatus to:

establish one or more probe data points as breakpoints; and subdivide the subset of probe data points into a plurality of subset divisions of probe data points, wherein the subset is divided at breakpoint probe data points.

11. The apparatus of claim 10, wherein causing the apparatus to establish one or more probe data points as breakpoints comprises causing the apparatus to:

identify probe data points that meet at least one criterion for establishing a breakpoint, wherein the at least one criterion comprises, for a probe data point, at least one of:

only a single map element within the radius of the probe data point;

no map elements within the radius of the probe data point; or no map elements in common with a next sequential probe data point.

12. The apparatus of claim 10, wherein causing the apparatus to map match the subset of probe data points to one or more road segments based on the correspondences between the map elements found within the radiuses of the probe data points of the subset of probe data points comprises causing the apparatus to:

map match the subset divisions of probe data points in parallel with one another to one or more road segments based on the correspondences between the map elements found within the radiuses of the probe data points of the subset division of probe data points.

13. A computer program product comprising at least one non-transitory computer-readable storage medium having computer-executable program code portions stored therein, the computer-executable program code portions comprising program code instructions configured to:

receive a plurality of probe data points, the plurality of probe data points received from a probe apparatus comprising one or more sensors and being onboard a vehicle, wherein the plurality of probe data points comprise location information associated with the probe apparatus and time information associated with the location information;

establish locations of the plurality of probe data points temporally sequenced along a path;

establish radiuses around the plurality of probe data points;

identify, from map data, map elements found within the radiuses;

filter the plurality of probe data points to obtain a subset of probe data points, wherein filtering the plurality of probe data points to obtain the subset of probe data points comprises filtering out excluded probe data points of the plurality of probe data points for which the map elements found within a radius of a respective excluded probe data point are the same as the map elements found within a radius of a preceding probe data point to obtain the subset of probe data points;

establish correspondences between the map elements found within the radiuses of probe data points of the subset of probe data points;

map match the subset of probe data points to one or more road segments based on the correspondences between the map elements found within the radiuses of the probe data points of the subset of probe data points; and generate a path of the probe apparatus along the one or more road segments.

14. The computer program product of claim 13, wherein the program code instructions to establish the correspondences between the map elements found within the radiuses of the probe data points of the subset of probe data points comprises program code instructions to:

identify the map elements within a radius of a respective probe data point of the subset of probe data points that match the map elements within a radius of a subsequent probe data point of the subset of probe data points.

15. The computer program product of claim 14, wherein the program code instructions to map match the subset of probe data points to one or more road segments based on the correspondences between the map elements found within the radiuses of the probe data points of the subset of probe data points comprises program code instructions to:

map match a first probe data point to a first map element in response to the first map element being an only map element common between a radius of the first probe data point and a radius of a next probe data point in the subset of probe data points.

16. The computer program product of claim 13, further comprising program code instructions to, after filtering the probe data points:

establish one or more probe data points as breakpoints; and subdivide the subset of probe data points into a plurality of subset divisions of probe data points, wherein the subset is divided at breakpoint probe data points.

17. The computer program product of claim 16, wherein the program code instructions to establish one or more probe data points as breakpoints comprises program code instructions to:

identify probe data points that meet at least one criterion for establishing a breakpoint, wherein the at least one criterion comprises, for a probe data point, at least one of:
only a single map element within the radius of the probe data point;
no map elements within the radius of the probe data point; or
no map elements in common with a next sequential probe data point.

18. The method of claim 1, wherein generating the path of the probe apparatus along the one or more road segments comprises:
generating the path of the probe apparatus along the one or more road segments in real-time based on traffic analysis.

19. The apparatus of claim 7, wherein causing the apparatus to generate the path of the probe apparatus along the one or more road segments comprises causing the apparatus to:
generate the path of the probe apparatus along the one or more road segments in real-time based on traffic analysis.

20. The computer program product of claim 13, wherein the program code instructions to generate a path of the probe apparatus along the one or more road segments comprise program code instructions to:
generate the path of the probe apparatus along the one or more road segments in real-time based on traffic analysis.

* * * * *